April 6, 1943.                H. T. OLSON                2,315,981
                  FILTER MOUNT FOR PHOTOGRAPHIC CAMERAS
                         Filed Oct. 3, 1941
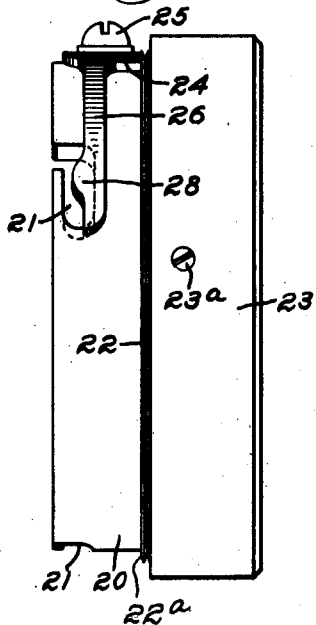
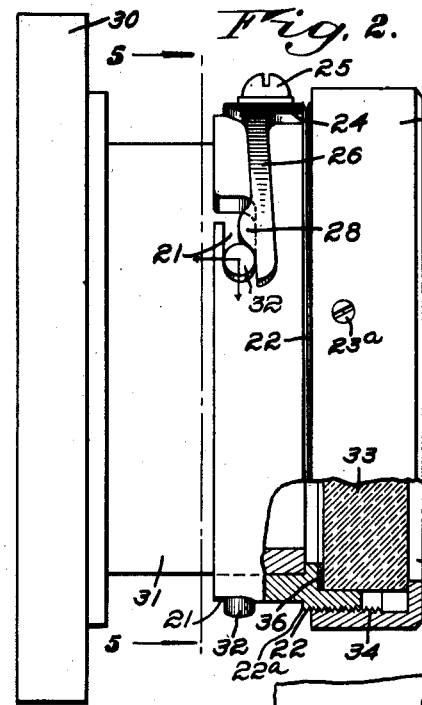
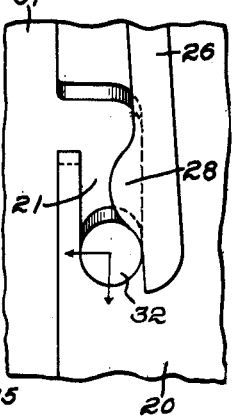
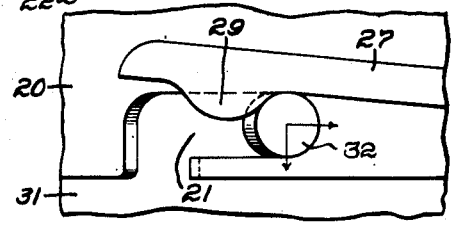
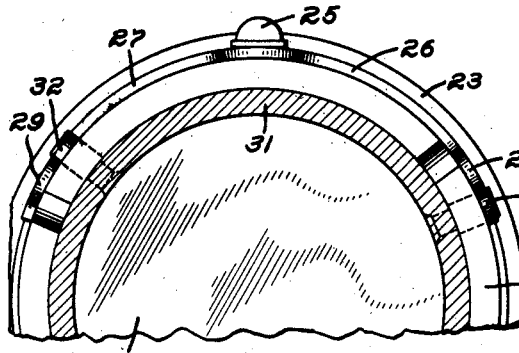
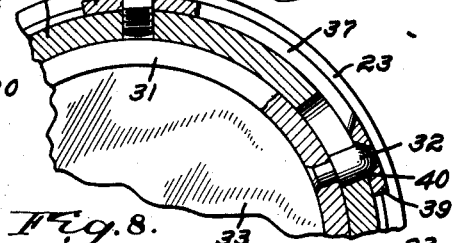
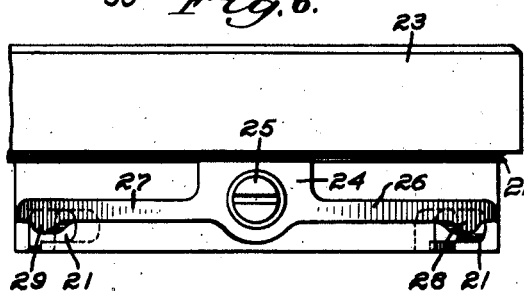
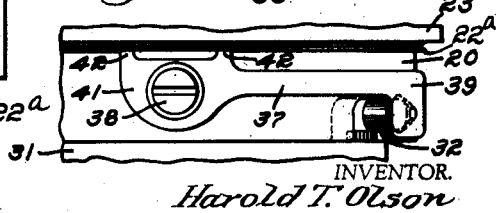
INVENTOR.
Harold T. Olson
BY
his ATTORNEYS Patented Apr. 6, 1943

2,315,981

UNITED STATES PATENT OFFICE 2,315,981

FILTER MOUNT FOR PHOTOGRAPHIC CAMERAS

Harold T. Olson, Rochester, N. Y., assignor to The Folmer Graflex Corporation, Rochester, N. Y., a corporation of Delaware Application October 3, 1941, Serial No. 413,435

9 Claims. (Cl. 95—81.5)

This invention relates to a new and improved filter mount for general application to photographic cameras, being particularly adapted to cameras used for aerial photography.

In order that the principle of the invention may be readily understood, I have disclosed a single embodiment thereof in the accompanying drawing, wherein—

Fig. 1 is a side elevation of the filter mount removed from the lens barrel;

Fig. 2 is a side elevation of the lens board and lens mount having the filter mount attached thereto;

Fig. 3 is a fragmentary detail in elevation of Fig. 2, on a larger scale, showing one of the locking pins and the locking spring member;

Fig. 4 is a fragmentary detail similar to Fig. 3, but showing one of the other locking pins and the opposite side of the locking spring;

Fig. 5 is a cross section of Fig. 2 on the line 5—5 of said figure;

Fig. 6 is a top plan view of Fig. 1;

Fig. 7 is a fragmentary section of the lens mount and filter mount showing an alternative locking means; and Fig. 8 is a top plan view of Fig. 6.

There has long been need for a satisfactory filter mount that can readily be attached and detached with a minimum amount of effort, particularly when heavy gloves are being worn, as it is necessarily the practice in aerial photography. It is also very important that the filter mount be held very securely to the lens barrel, so as to prevent the possibility of the filter mount vibrating when the camera, with filter mounted thereon, is carried in an airplane. While this invention is particularly adapted to aerial cameras, it also constitutes an important improvement on filter mounts as applied to hand cameras.

One object of the invention is to provide a filter mount that is readily attachable to and detachable from the lens barrel. Other objects are to provide a filter mount that is held securely against inadvertent removal when in place; to provide a filter mount having locking means to prevent movement or vibration; to provide a filter mount wherein filters can be readily interchanged; and to provide a filter mount having means to prevent distortion of the filter due to contraction or expansion of the filter mount.

Referring first to the preferred form of my invention shown in Figs. 1 to 6, there is shown therein the filter mount for attachment to a photographic lens barrel. The said filter mount comprises a cylindrical body member 20 having along one circumferential edge thereof a series consisting of two or more bayonet type slotted openings 21, a total of three being indicated in Figs. 1 and 2 when taken with Fig. 5. The said member 20 has its opposite circumferential edge formed as an enlarged threaded portion 22 providing a circumferential shoulder 22a, as best shown in Figs. 1 and 2, said threaded portion receiving an internally threaded retaining cap 23 locked in place by a locking screw or screws 23a. Spring means are provided to cooperate with the hereinafter described locking pins, and in the form of my invention shown in Figs. 1 to 6, said locking means comprises a spring 24 secured to the body member 20 by means of a screw 25, which holds an adjacent edge of said spring against said shoulder 22a, the said spring being provided with two opposite arms 26, 27, best shown in Figs. 5 and 6. The outer ends of the said spring arms 26, 27 are provided with cam shaped lobes or enlargements 28, 29 respectively.

Within the scope of my invention, the bayonet slots 21 may be formed in an edge of the camera lens barrel which in such case would also have the said spring means secured thereto, and the hereinafter described locking pins would be provided upon the filter supporting body member, but I prefer to provide the bayonet slots in the body member and to support the spring means on said body member as herein shown, thus providing a unitary structure.

In Fig. 2 is represented at 30 a lens board of a camera to which is attached any suitable lens barrel 31 provided in the disclosed embodiment of my invention with three locking pins indicated at 32. While any suitable number of locking pins in excess of two may be provided, I have herein represented three, spaced 120° apart, and therefore I provide an equal number of bayonet slots 21, but in the structure herein shown in connection with the third bayonet slot, which in Figs. 1 and 2 appears at the bottom of the said figures, I do not necessarily provide cooperating spring means, the said third bayonet slot and locking pin being for the purpose of providing a third point of support for the body member. However, similar spring locking means may be provided at such bayonet slot if desired.

Each bayonet slot or opening 21 is of the shape shown most clearly in Figs. 1, 2, 3 and 4, and the shape is such that the body member 20 can be placed on the lens barrel 31 and the several locking pins 32 of the lens barrel 31 will enter said respective slots 21. When the filter mount body member is turned in a clockwise direction, viewing the figures, the said spring arms 26, 27 will be caused to be moved in a right hand direction viewing Figs. 1, 2 and 3, due to the engagement of the cams 28, 29 and two of the locking pins 32, until said pins 32 reach the bottom of the slots 21, whereupon the spring arms 26, 27 having said cam lobes 28, 29 will hold the locking pins 32 in the position shown in Figs. 2, 3 and 4.

Viewing Figs. 2 and 3, it will be evident that the cam lobe 28 prevents the filter mount body member 20 from turning in a contraclockwise direction, and viewing Fig. 4 it will be evident that the cam lobe 29 also prevents the filter mount body member from turning in a contraclockwise direction. The bottom and inner end walls of each slot 21 prevent the filter mount body member from turning in a clockwise direction. Thus the said body member is securely held to the lens barrel 31, and inasmuch as the said lobes 28, 29 are of cam shaped formation, lateral pressure is applied against the sides of the locking pins 32 engaged thereby, forcing them against the bottom and closed inner ends of the respective bayonet slots 21, and the spring arms 26, 27 tend to force the said locking pins 32 against the bottom walls of said slots. The result of the forces (which forces I have indicated by arrows on Figs. 2, 3 and 4) prevents any movement of the filter mount body member with respect to the lens barrel 31.

The said body member 20 is provided with a suitable enlargement, or is of such diameter at the circumferential edge thereof opposite the bayonet slots as to receive a filter 33 of usual character. The filter retaining cap 23 is of cup shaped formation having internal threads 34 and an opening 35, clearly indicated in Fig. 2. When the filter retaining cap 23 is screwed onto the body member 20, the filter 33 will be tightly held in said body member 20, and I provide a ring washer 36, shown in Fig. 2, of any suitable material such as cork, to assure that even pressure is applied on the filter by the filter ring 23 throughout the circumferential extent thereof. The said washer is sufficiently pliable, yielding or compressible to provide for contraction and expansion of the filter mount body member and of the retaining cap 23 without causing undue strain on the filter 33, and said cap 23 is held in position by the locking screw 23a. The use of a washer in this connection is important in that the filter mount is particularly adapted for use on aerial cameras where a great deal of vibration takes place and also changes in temperature.

In Figs. 7 and 8, I have represented a modified form of my invention. There is therein shown one spring only, but it is to be understood that I may provide a separate spring for each bayonet slot and locking pin, or for two of them, or if desired the spring may be provided with two members to engage two locking pins as in Figs. 1 to 6, thus being provided with oppositely extending arms.

In the modified form of my invention shown in Figs. 7 and 8, each locking pin 32 is provided with a spherical or rounded end engaged by a single spring 37 held in place upon the filter mount body member 20 by means of a screw 38. Such spring 37 is provided with a boss or enlargement 39 on its outer end, having a cone shaped or like opening or countersink 40 to engage the top of the pin 32. The said spring 37 is provided with an enlarged opposite end 41 having feet 42, 42 to engage the threaded circumferential shoulder 22a on the body member and prevent turning of the spring 37, thus holding it in place as in the construction shown in Figs. 1 to 6, where it is evident that the locking spring 24 is so shaped, where supported by the screw 25, that an edge of said spring engages the threaded shoulder 22a.

It will be evident from the foregoing description that I have provided a filter mount having a number of important features, and which filter mount is very readily attachable to and detachable from the lens mount, and that the filter mount is especially suitable for use on aerial cameras where a great deal of vibration occurs. My invention, however, is not limited to use upon aerial cameras.

So far as I am aware, filter mounts previously provided were either permanently attached or there was a strong possibility of their shaking loose and falling off the camera, in which event the pictures subsequently taken would be made without a filter. Furthermore, if the construction were such as to permit vibration of the filter mount, the filter itself would be very likely to be damaged.

Having thus described two embodiments of the invention, it is to be understood that although specific terms are employed, they are used in a generic and descriptive sense and not for purposes of limitation, the scope of the invention being set forth in the following claims.

I claim:

1. In a filter mount for photographic cameras wherein there is provided a body member supporting the filter and retaining cap therefor, which body member has a peripheral surface that is truly cylindrical throughout, and wherein there is provided a lens barrel to receive detachably said cylindrical body in concentric relation thereto, which lens barrel has a peripheral surface that is truly cylindrical throughout for such concentric reception of the said body member, and wherein one of said parts—viz. the body member and the lens barrel—is provided at an edge thereof with a plurality of spaced bayonet-type slotted openings and the other of said two parts is provided with a corresponding plurality of correspondingly spaced radial pins for reception in said slotted openings; cooperating holding means for maintaining said pins and slotted openings in locking relation, said cooperating holding means including a spring arm for at least one of said slotted openings and its pin, said spring arm being curved to present an inner face that is concentric with and is received directly against the peripheral surface of that one of said parts that has the slotted openings, said cooperating holding means also including securing means to secure each such spring arm in said concentric position partially overlying the corresponding slotted opening, so as to engage and press against a lateral surface of the corresponding pin, and so that relative turning movement of the said two parts to disengage the same causes each such pin to stress or flex the corresponding spring arm upon said securing means as its point of support along the concentric peripheral surface to which it is secured.

2. A structure according to claim 1, but in which the bayonet slotted opening or openings is or are formed in the filter-supporting body member and the locking pin or pins is or are provided upon the camera lens barrel.

3. A structure according to claim 1, but in which each spring arm is provided with a cam portion so positioned on the active edge thereof as to press against a side edge of the locking pin and hold the same firmly in position in the bayonet slotted opening wherein it is received.

4. A structure according to claim 1, but in which there are provided at least two bayonet slots in the filter-supporting body member, and at least two locking pins upon the camera lens barrel to engage said bayonet slots respectively, and wherein the said spring arm is a single piece having two oppositely extending spring arm portions to engage respectively the two locking pins in said two bayonet slotted openings, and wherein the said securing means is provided between said two spring arm portions, to secure the said single-piece spring arm onto the said body member.

5. A structure according to claim 1, but in which there are provided at least two bayonet slots in the filter-supporting body member, and at least two locking pins upon the camera lens barrel to engage said bayonet slots respectively, and wherein the said spring arm is a single piece having two oppositely extending spring arm portions to engage respectively the two locking pins in said two bayonet slotted openings, and wherein means is provided between said two spring arm portions, to secure the said single-piece spring arm onto the said body member, each of said spring arm portions having a cam formation along an edge thereof positioned to press against a side edge of the corresponding locking pin so as to hold the same firmly in position in the bayonet slotted opening wherein it is received.

6. A structure according to claim 1, but in which a plurality of bayonet slotted openings are formed at spaced points along one circumferential edge of the filter-supporting body member and wherein the opposite circumferential edge of said body member is threaded for the reception of the said retaining cap.

7. A structure according to claim 1, but in which a plurality of bayonet slotted openings are formed at spaced points along one circumferential edge of the filter-supporting body member and wherein the opposite circumferential edge of said body member is threaded for the reception of the said retaining cap, and wherein the said threaded edge is circumferentially enlarged to provide an annular shoulder which is engaged by an edge of said spring arm to cooperate in holding the same.

8. A structure according to claim 1, but in which the spring arm is provided with a socket adapted to receive therein the outer end of a locking pin when the latter is received in its bayonet slotted opening.

9. A structure according to claim 1, but in which the spring arm is provided with a socket adapted to receive therein the outer end of a locking pin when the latter is received in its bayonet slotted opening, and in which the said spring arm is secured to the body member by a retaining screw 38 and is provided with projections 42, 42 to engage a part of the structure and thereby to prevent turning of the spring arm upon said screw.

HAROLD T. OLSON.